United States Patent
King et al.

(10) Patent No.: US 11,310,718 B2
(45) Date of Patent: Apr. 19, 2022

(54) WIRELESS DISCOVERY, ROUTING AND ADVERTISEMENT PROTOCOL FOR SECURE REMOTE SERVICES IN A COMMUNICATION ENVIRONMENT

(71) Applicant: EMC IP Holding Company LLC, Hopkinton, MA (US)

(72) Inventors: James R. King, Norwood, MA (US); Justin A. Kenney, Upton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 16/523,473

(22) Filed: Jul. 26, 2019

(65) Prior Publication Data

US 2021/0029614 A1   Jan. 28, 2021

(51) Int. Cl.
*H04W 40/24* (2009.01)
*H04W 48/16* (2009.01)
*H04W 84/18* (2009.01)

(52) U.S. Cl.
CPC ....... *H04W 40/246* (2013.01); *H04W 40/244* (2013.01); *H04W 48/16* (2013.01); *H04W 84/18* (2013.01)

(58) Field of Classification Search
CPC . H04W 40/246; H04W 40/244; H04W 48/16; H04W 84/18
See application file for complete search history.

(56) References Cited

U.S. PATENT DOCUMENTS

| | | | |
|---|---|---|---|
| 7,835,301 B1 * | 11/2010 | Maufer | H04W 24/02 370/254 |
| 9,958,277 B1 | 5/2018 | Espy et al. | |
| 2017/0367029 A1 * | 12/2017 | Alexander | H04W 4/80 |
| 2018/0356492 A1 * | 12/2018 | Hamilton | G01S 13/76 |
| 2020/0259928 A1 * | 8/2020 | Bonas | G06F 16/955 |

OTHER PUBLICATIONS

Bluetooth Sig, Inc., "Service Discovery," https://www.bluetooth.com/specifications/assigned-numbers/service-discovery/, 2019, 18 pages.

opengarden.com, "The Internet of US," https://www.opengarden.com/, 2018, 2 pages.

\* cited by examiner

*Primary Examiner* — Melvin C Marcelo
(74) *Attorney, Agent, or Firm* — Ryan, Mason & Lewis, LLP

(57) ABSTRACT

In a computing environment comprising a plurality of compute, storage and network assets, a method initiates at a given asset a join operation for the given asset to become a member of a mesh network formed by the plurality of compute, storage and network assets. A network neighbor data structure associated with the given asset is created/updated based on the join operation. The method initiates at the given asset a route discovery operation to identify one or more routes through the mesh network to enable the given asset to access a remote support gateway. A network routing data structure associated with the given asset is created/updated based on the route discovery operation. The given asset may also advertise at least a portion of its routing data structure to the compute, storage and network assets in the computing environment.

20 Claims, 4 Drawing Sheets

200

―― FROM FIG. 2 ――

NEIGHBOR TABLE
(EACH NODE STORES ITS VIEW OF OTHER NODES)

ROUTING TABLES
(EACH NODE STORES ITS OWN)

```
A: {
  → A: 0 dB * (Node ID <= 100)
  → B: -22 dB * (Node ID <= 100)
    E: -25 dB
}                                    207-A
```

```
A (gateway connected): {Advertise: v1 (0), v2 (32)
  Use:
    v1 via A (wt: 0)
    v2 via B (wt: 32)
    v1 via B (wt: 32)
}                                    209-A
```

```
B: {
  → A: -22 dB * (Node ID <= 100)
    B: 0 dB * (Node ID <= 100)
    C: -25 dB
    D: -57 dB
}                                    207-B
```

```
B (gateway connected): {Advertise: v1 (0), v2 (0)
  Use:
    v1 via B (wt: 0)
    v2 via B (wt: 0)
    v1 via A (wt: 32)
}                                    209-B
```

```
C: {
  → B: -25 dB * (Node ID <= 100)
  → D: -18 dB
    E: -25 dB
}                                    207-C
```

```
C: {
Advertise: v1 (35), v2 (35)
  Use:
    v1 via B (wt: 35)
    v2 via B (wt: 35)
    v1 via D (wt: 70)
    v2 via D (wt: 70)
}                                    209-C
```

```
D: {
    B: -57 dB * (Node ID <= 100)
  → C: -10 dB
  → E: -35 dB
}                                    207-D
```

```
D: {
Advertise: v1 (35), v2 (35)
  Use:
    v1 via C (wt: 35)
    v2 via C (wt: 35)
    v1 via E (wt: 70)
    v2 via E (wt: 70)
}                                    209-D
```

```
E: {
  → A: -25 dB * (Node ID <= 100)
    B: -30 dB * (Node ID <= 100)
  → C: -18 dB
    D: -35 dB
}                                    207-E
```

```
E: {
Advertise: v1 (35), v2 (35)
  Use:
    v1 via A (wt: 35)
    v2 via A (wt: 35)
    v1 via C (wt: 63)
    v2 via C (wt: 63)
}                                    209-E
```

*FIG. 2 cont.*

WIRELESS DISCOVERY, ROUTING AND ADVERTISEMENT PROTOCOL FOR SECURE REMOTE SERVICES IN A COMMUNICATION ENVIRONMENT

FIELD

The field relates generally to computing environments, and more particularly to techniques for automatically enabling remote support of assets in such computing environments.

BACKGROUND

Data centers are computing environments that include compute, storage and network resources (assets) arranged in multiple rack-mounted enclosures (equipment racks or, simply, racks) placed at various locations within a physical space. Each rack may contain one or more of the compute, storage and networking assets, and the racks and their assets collectively constitute the data center. In some scenarios, a data center includes a cloud computing platform, where "cloud" refers to a collective computing infrastructure that implements a cloud computing paradigm. For example, cloud computing is a model for enabling ubiquitous, convenient, on-demand network access to a shared pool of configurable resources (e.g., compute, storage, network assets) that can be rapidly provisioned and released with minimal management effort or service provider interaction. The dynamic provisioning and interconnection of the various assets is accomplished while the various assets remain positioned in their respective racks. However, providing support for the various assets within a given data center can present significant challenges.

SUMMARY

Embodiments of the invention provide techniques for automatically enabling remote support of assets in computing environments such as, for example, data centers.

For example, in one embodiment, a method comprises the following steps. In a computing environment comprising a plurality of compute, storage and network assets, a method initiates at a given asset a join operation for the given asset to become a member of a mesh network formed by the plurality of compute, storage and network assets. A network neighbor data structure associated with the given asset is created/updated based on the join operation. The method initiates at the given asset a route discovery operation to identify one or more routes through the mesh network to enable the given asset to access a remote support gateway. A network routing data structure associated with the given asset is created/updated based on the route discovery operation. The given asset may also advertise at least a portion of its routing data structure to the compute, storage and network assets in the computing environment.

Advantageously, illustrative embodiments provide for methods enabling automatic connection to a remote support service for assets in a computing environment.

These and other features and advantages of the invention will become more readily apparent from the accompanying drawings and the following detailed description.

DETAILED DESCRIPTION

Figure 1:
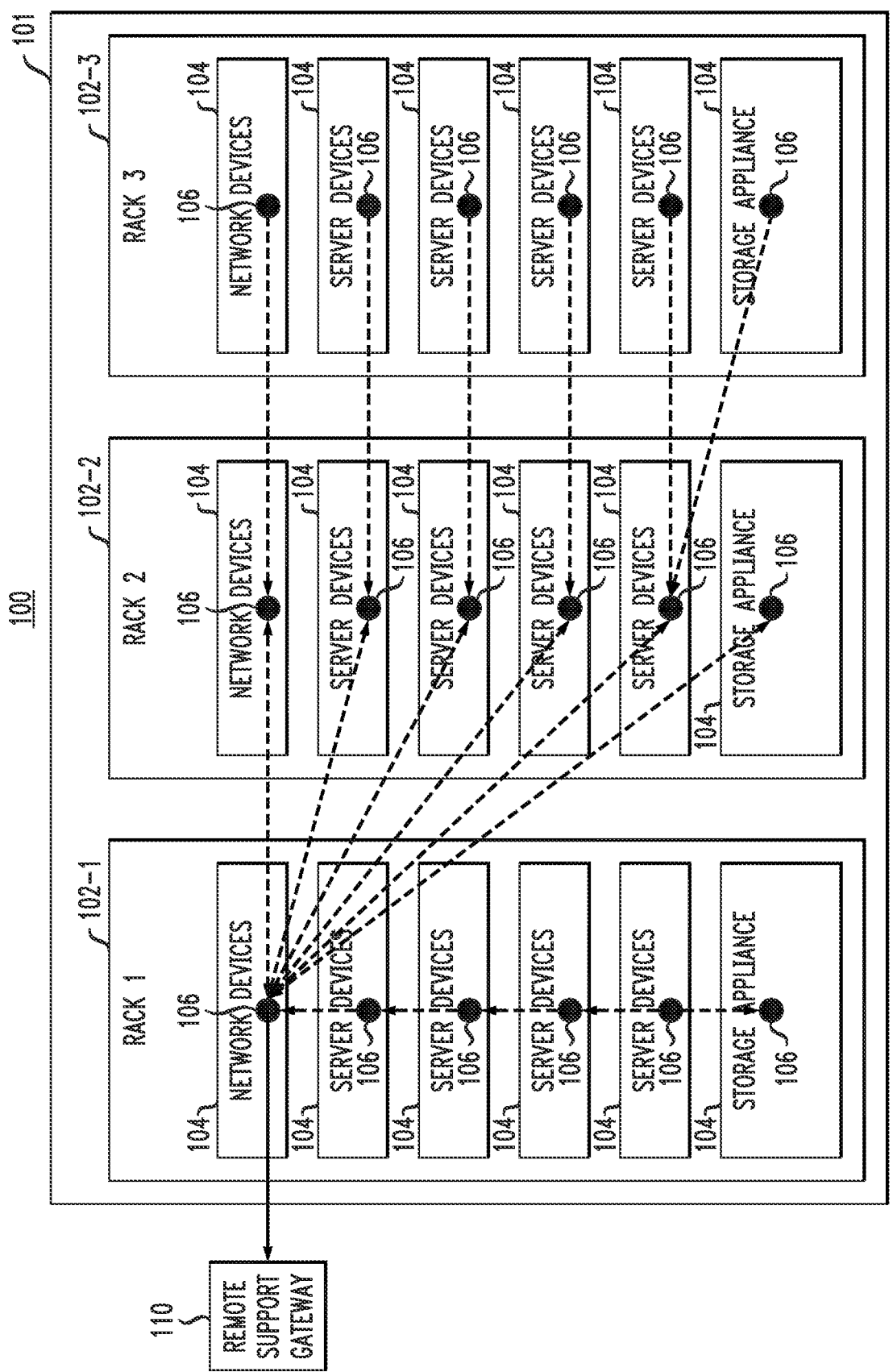
FIG. 1 is a block diagram of a computing environment with assets operatively coupled to a remote support gateway, according to an embodiment of the invention.

Illustrative embodiments may be described herein with reference to exemplary computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

In some computing environments at customer or other locations, service and support for compute, storage and network assets in the computing environment are remotely provided by a provider of the assets (e.g., product manufacturer and/or product supplier) via a gateway computing device (remote support gateway). Such a remote support gateway is deployed and then individually configured within each asset/product for which remote support will be provided. Then, as each asset is introduced into the computing environment (e.g., installed in a rack in a data center), the asset can be remotely supported by the manufacturer or supplier through the gateway. For example, a product manufacturer can troubleshoot and/or reconfigure a server, storage appliance or network device installed in a data center from a physical location other than the physical location of the data center by electronically connecting to the asset through the remote support gateway (e.g., sending troubleshooting test commands, reading troubleshooting test results, sending (re-)configuration commands, reading performance logs, etc.).

One example of a remote support gateway is a remote support service solution from Dell EMC Corporation (Hopkinton, Mass.) called the EMC Secure Remote Support (ESRS) gateway. However, it is realized that many scenarios exist where field engineers or customers fail to manually configure the connection for the asset to the ESRS gateway, leading to the appearance of no support. For example, an asset installed by the customer or field engineer of the manufacturer/supplier that is not properly manually configured to communicate with the ESRS gateway will fail to send alerts back to the manufacturer/supplier to notify them of some problem or potential problem. This leads to the possibility of a poor customer experience and/or a violation of agreed upon Service Level Agreements (SLAs) that cost the manufacturer/supplier money and hurts its reputation with customers.

Other issues with existing remote support gateway solutions is that setup and configuration can be cumbersome and error prone. Also, customers may be hesitant to upgrade existing remote support implementations due to single-point of failure and since it is a tertiary concern during data center platform installation and upgrades. Further, locating devices that are in failure mode for service and support personnel to quickly do field replacement unit (FRU) swaps is a challenge. FRUs are assets that can be quickly and easily installed in a rack of the data center by the customer or field engineer to replace a failed asset. Still further, as mentioned, many customers and/or field engineers fail to setup the remote support tool leading to missed SLAs with customers.

Illustrative embodiments overcome the above and other drawbacks associated with the existing manual methods of connecting an asset to a remote support gateway by automatically enabling remote support of assets in computing environments. Among other advantages, enabling assets of a data center to automatically participate as an access point in a route to the remote support gateway can reduce single points of failure in the data center.

Turning now to FIG. 1, a computing environment 100 is depicted with a data center 101 having multiple racks 102-1 (Rack 1), 102-2 (Rack 2) and 102-3 (Rack 3). Each rack contains assets 104 including compute assets (computing devices such as, for example, server devices), storage assets (storage appliances such as, for example, arrays) and network assets (network devices such as, for example, switches and routers). Each asset 104 has a positioning beacon 106 mounted thereon or therein. Broadcasting/beacon technology (inclusive of, but not limited to, Bluetooth, RFID, and other broadcasting technologies) in the form of beacon 106 can be installed on each asset 104 as part of manufacturing process or after manufacturing (e.g., on site). These beacons have a unique identifier enabling correlation of one signal to one asset.

In illustrative embodiments, these beacons 106 are also configured to wirelessly communicate with one another and pass messages and other data thereby forming a peer-to-peer (distributed or decentralized) mesh network. The mesh network enables each beacon 106 to wirelessly communicate with remote support gateway 110 through a route that may include multiple hops, as shown in FIG. 1. A hop is the connection or link from one beacon 106 to another beacon 106 or from a beacon 106 to remote support gateway 110. Thus, a beacon 106 of an asset 104 in rack 102-3 may utilize a three-hop route to communicate with remote support gateway 110. The connection from the last beacon 106 (endpoint) in the route to remote support gateway 110 may be a standard Internet Protocol (IP) network connection.

The dashed lines in FIG. 1 connecting the beacons 106 depict the mesh network. That is, the distributed network uses peer-to-peer transfer of data to ensure that data can be routed through members of this ad-hoc network. A mesh network is a network topology in which the devices connect directly, dynamically and non-hierarchically to as many other devices as possible and cooperate with one another to efficiently route data therebetween.

Note that the number of racks and assets in FIG. 1 is illustrative and thus a data center that implements one or more embodiments can have more or fewer racks and/or assets. Also, while beacon 106 is described above as providing the message transferring functionalities, in alternative embodiments, parts of the asset itself can be configured to perform all or part of those functionalities. Still further, while the mesh network in FIG. 1 illustrates one beacon 106 of an asset 104 (the top most asset mounted in rack 102-1) being operatively coupled to remote support gateway 110 and all routes to remote support gateway 110 going through that beacon/asset, it is to be understood that this is for illustration only and embodiments contemplate multiple beacons/assets being operatively connected to a remote support gateway as endpoints. In fact, there may be multiple remote support gateways through which beacons/assets are operatively coupled as will be depicted and described below in the context of FIG. 2.

Figure 2:
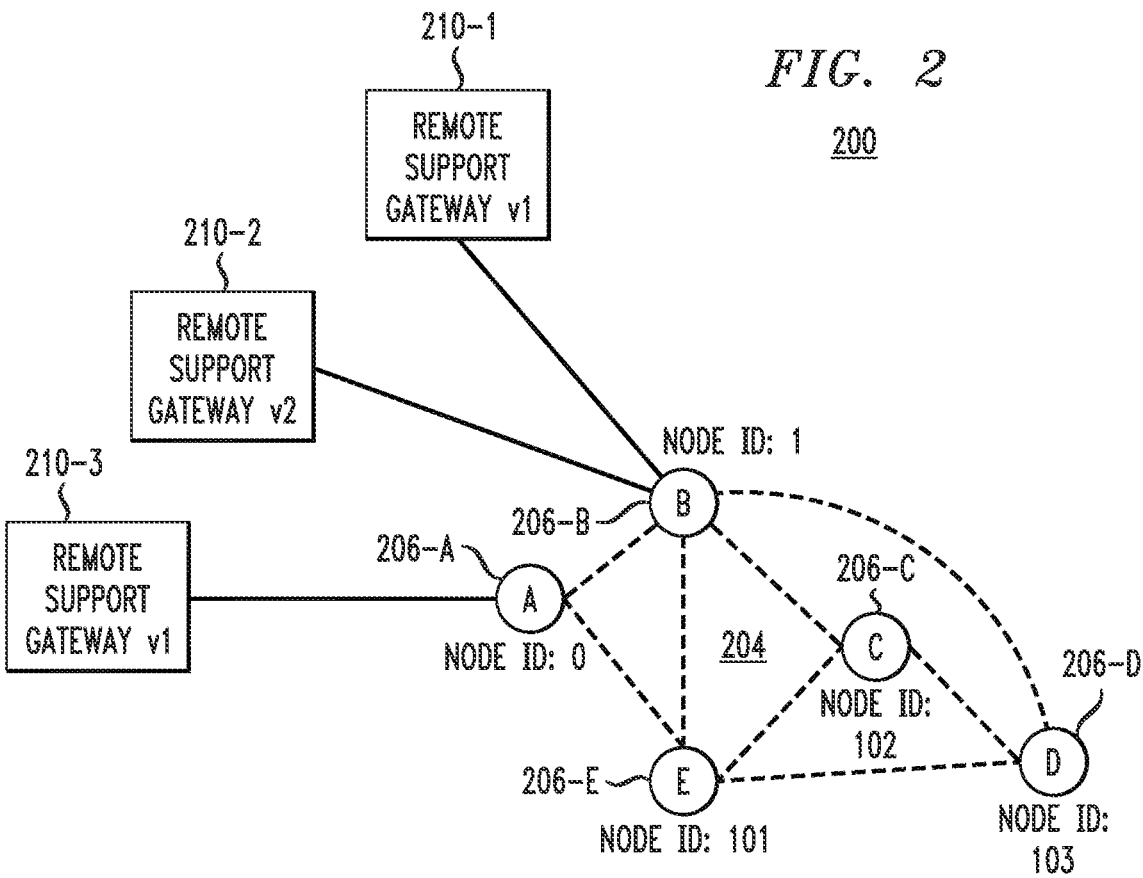
FIG. 2 is a block diagram of an architecture for automatically enabling remote support of assets in a computing environment, according to an embodiment of the invention.

FIG. 2 depicts an architecture 200 for automatically enabling remote support of assets in a computing environment, according to an embodiment of the invention. More particularly, FIG. 2 depicts a mesh network 204 with a plurality of nodes 206-A through 206-E. Each node 206 represents an asset (104) with a beacon (106) as described above in the context of FIG. 1. As further shown, multiple nodes 206 (206-A and 206-B) are operatively coupled to multiple remote support gateways 210-1 through 210-3. These nodes that are connected to remote support gateways 210 are referred to as remote support gateway endpoints. The mesh network 204 and its node topology is depicted by dashed lines while standard IP network connections between the remote support gateway endpoints and the remote support gateways 210 are depicted as solid lines. In an illustrative embodiment, there can be over 100 nodes, and less than or equal to 100 remote gateway endpoints. Each node has its own unique identifier (Node ID such as Node ID 0, Node ID 1, Node ID 101, Node ID 102, Node ID 103 as shown in FIG. 2). Note also that while each asset/beacon in the data center has its own Node ID, a given mesh network having all or less than all the assets may be formed in an ad-hoc manner at a given time. Note further that each gateway can be a different version, i.e., remote support gateway 210-1 and 210-3 are version 1 (v1) while remote support gateway 210-2 is version 2 (v2). Versioning as illustratively used here refers to software version and/or exposed interfaces from the remote support gateway. For instance, if there is an asset that is compatible with v1 of the gateway, instead of needing to upgrade all older assets with the v1 compatibility to v2, dynamic routing of old to old and new to new can be deployed and/or enabled. This ensures that backward compatibility of interfaces in each gateway deployment does not need to be continuously maintained.

As further shown, each node 206 has implemented thereon or otherwise associated therewith a neighbor data structure (e.g., table) 207 and a routing data structure (e.g., table) 209, i.e., node 206-A has neighbor table 207-A and routing table 209-A, node 206-B has neighbor table 207-B and routing table 209-B, node 206-C has neighbor table 207-C and routing table 209-C, node 206-D has neighbor table 207-D and routing table 209-D, and node 206-E has neighbor table 207-E and routing table 209-E.

Thus, each node 206 is configured to store (create) and maintain (update) the neighbor table 207 which provides a view of the other nodes in the mesh network topology 204. The view provided by the neighbor table 207 is determined by a given node 206 based on received signal strength (RSS) measurements from beacons of other nodes 206 that are in proximity to the given node 206.

Further, each node 206 is configured to store (create) and maintain (update) routes in the routing table 209 routes through other nodes 206 in mesh network 204 through which the given node can access at least one of the remote support gateways 210. These routing tables 209 (or portions thereof)

are advertised by nodes 206 to other nodes 206 in the mesh network 204, as will be further explained below.

In some embodiments, each node selects the top two nodes through which to connect to form a route based on RSS measurements. When RSS measurements are equal, the tie is settled by the node ID (e.g., the neighbor node with the lower Node ID is selected). Note that routes are weighted in illustrative embodiments. In some embodiments, route weight is RSS magnitude relative to the antenna dynamic range of the beacon (e.g., −120 to 10 dB). Thus, for example, take node 206-A. Neighbor table 207-A indicates that the RSS measurement for node 206-B is −22 dB. Thus, a route to remote support gateway v2 210-2 through node 206-B has a weight calculated as follows:

$$-22 \text{ dB} => -x + 10 => -(-22) + 10 => 32$$

This route is stored in routing table 209-A and advertised as v2(32). In illustrative embodiments, routing tables are advertised with priority based on weights to other nodes. One ordinarily skilled in the art will realize the various entries in the neighbor tables 207 and routing tables 209 for each node based on this example. Note also that multi-hop routes are additive. Note further that each node 206, in illustrative embodiments, broadcasts (beacon signal) its presence, its default route, and the versions of remote support gateway 210 to which it can connect. Again, each route is a wireless route in one or more embodiments.

Figure 3:
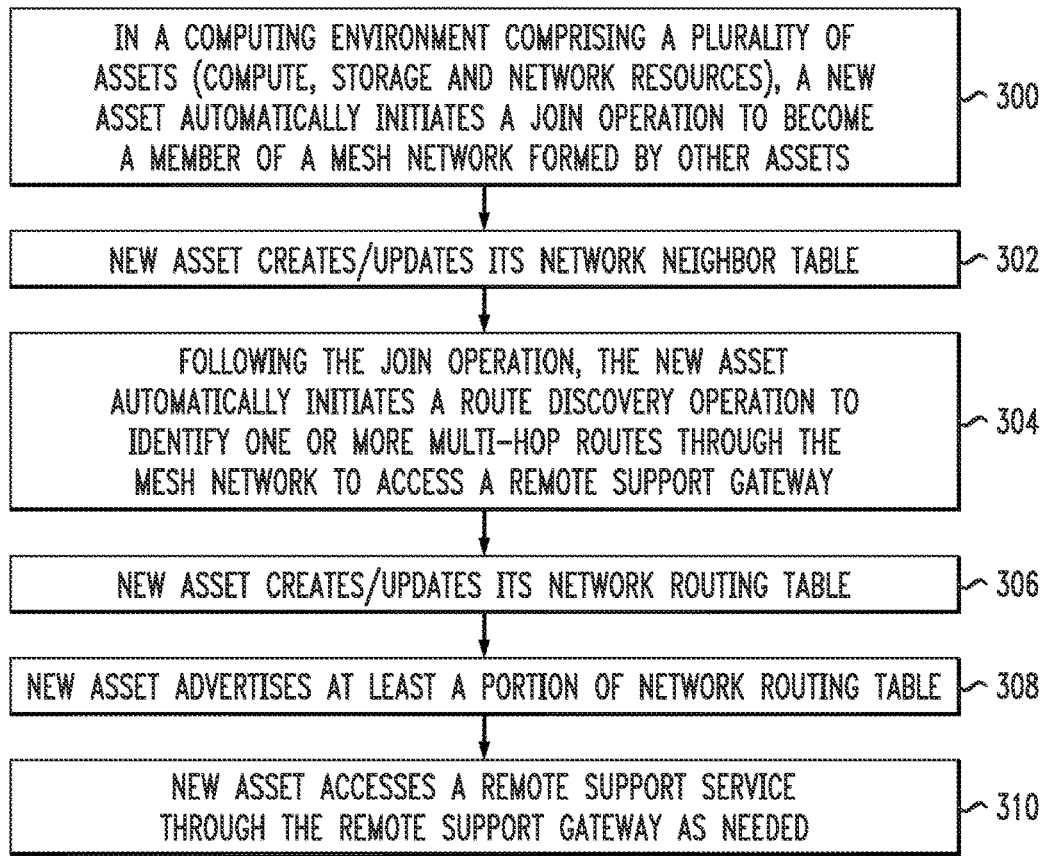
FIG. 3 is a flow diagram of a methodology for automatically enabling remote support of assets in a computing environment, according to an embodiment of the invention.

Given the architecture described above in the context of the FIG. 2 embodiment, it is to be appreciated that assets deployed in a given data center are configured to have some form of wireless communication in a relatively short distance configuration, e.g., to one or more neighboring assets. Further, assets 206 are configured to execute a software stack that runs a discovery type service, an upgrade service, an alert application programming interface (API) versioning service, and a message routing service. FIG. 3 illustrates one or more of these services.

More particularly, FIG. 3 depicts a methodology for automatically enabling remote support of assets in a computing environment (e.g., 200 in FIG. 2), according to an embodiment of the invention.

In step 300, a given asset initiates a network join operation (an asset which can be a new asset added to the data center or an existing asset that is rejoining) to become a member of a mesh network formed by other compute, storage and network assets (e.g., 206 in FIG. 2). The security of this operation is outside the scope of this disclosure but, in illustrative embodiments, a schema may be provided that ensures only signed/authentic products (assets) can join the mesh network topology.

In step 302, a network neighbor data structure (e.g., 207 in FIG. 2) associated with the given asset is created/updated based on the join operation.

In step 304, the given asset initiates a route discovery operation to identify one or more routes through the mesh network to enable the given asset to access a remote support gateway (e.g., one or more of remote support gateways 210-1, 210-2 and 210-3 in FIG. 2). Route discovery can be performed in any number of ways, e.g., a Border Gateway Protocol (BGP) functionality can be employed in certain embodiments to find one or more routes (e.g., a default route from the given asset to a remote support gateway).

In step 306, a network routing data structure (e.g., 209 in FIG. 2) associated with the given asset is created/updated based on the route discovery operation.

In step 308, the given asset advertises at least a portion of its routing data structure to compute, storage and network assets in the data center.

In step 310, the given asset accesses a remote support service through one or more of the remote support gateways (e.g., 210-1, 210-2 and 210-3) as needed.

Advantageously, in accordance with illustrative embodiments, the amalgamation of assets creates a mesh network with multi-hop redundancy to ensure consistent remote support gateway access. An asset could select a route through an older version of a remote support gateway (routed based on alert versioning) or route through a newer version of a remote support gateway in the computing environment. This functionality solves the issue with upgrades and or possible misconfiguration since only one working gateway configuration would be required in any datacenter (with more than one gateway recommended for redundancy).

An additional functionality in accordance with illustrative embodiments is network tomography and beacon mapping to infer asset locality. With an "anchor" device (asset), the system can use the beacon strength of the mesh network to determine proximate location of other devices on the network. These anchor devices would serve as a pseudo indoor global positioning system (GPS) type solution to triangulate the location of an asset. Thus, returning to FIG. 2, node 206-A could function as an anchor device. With three or more devices, the system could also infer relative asset height (or other physical dimensions) within a rack and infer the rack unit location of an asset within a data center. This would effectively solve the locality challenges that exist within many data centers undergoing support operations.

The particular processing operations and other system functionality described in conjunction with FIGS. 1, 2 and 3 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

The following is a non-limiting illustrative use case with which the above-described data center map generation architecture and methodologies can be applied in some embodiments.

By adding a simple Bluetooth interface to each server (e.g., Dell EMC PowerEdge Servers) and leveraging the service discovery prefixes in the Bluetooth protocol, a basic discovery implementation can be achieved. For routing, an open mesh implementation (e.g., Open Garden) would handle the basic routing premises. The remaining functionalities could then be implemented within the Integrated Dell Remote Access Controller or iDRAC (Dell EMC Corporation, Hopkinton, Mass.). iDRAC is a computing platform designed to make server administrators more productive and improve the overall availability of servers by alerting administrators to server issues, help them perform remote server management, and reduce the need for physical access to the server.

Figure 4:
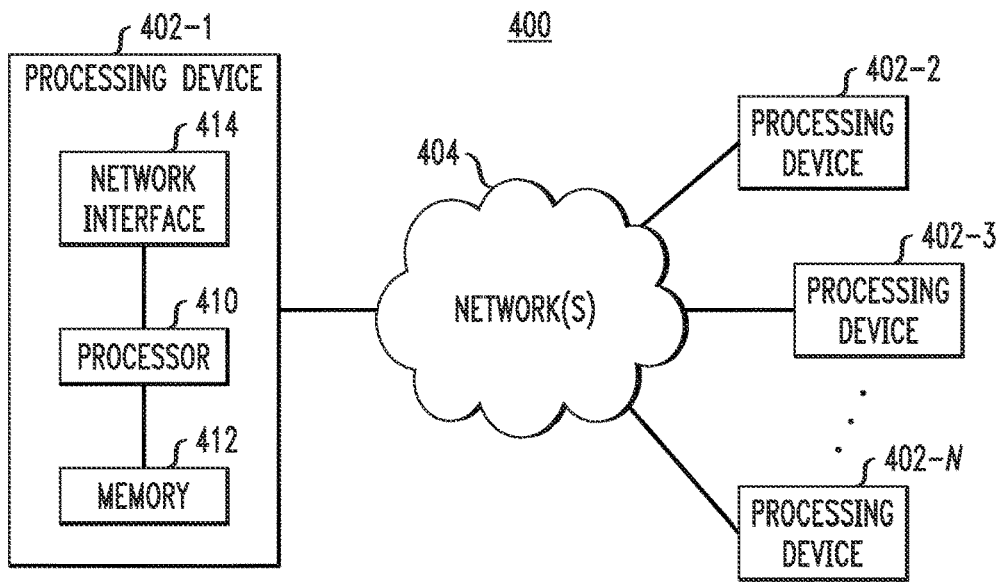
FIG. 4 illustrates a processing platform used to implement an architecture for automatically enabling remote support of assets in a computing environment, according to an embodiment of the invention.

FIG. 4 illustrates a processing platform used to implement an architecture for automatically enabling remote support of assets in a computing environment, according to an embodiment of the invention. More particularly, processing platform 400 is a processing platform on which a computing environment with automatic remote support enablement for assets (e.g., FIGS. 1-3 and otherwise described herein) can be implemented.

The processing platform 400 in this embodiment comprises a plurality of processing devices, denoted 402-1, 402-2, 402-3, . . . 402-N, which communicate with one another over network(s) 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment. Note that components described, for example, in the architecture 200 of FIG. 2 can comprise one or more of such processing devices 402 shown in FIG. 4. The network(s) 404 represent one or more communications networks that enable components to communicate and to transfer data therebetween, as well as to perform other functionalities described herein.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random-access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the networks 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
in a computing environment comprising a plurality of compute, storage and network assets, initiating at a given asset a join operation for the given asset to become a member of a mesh network formed by the plurality of compute, storage and network assets;
one of creating and updating a network neighbor data structure associated with the given asset based on the join operation;
initiating at the given asset a route discovery operation to identify one or more routes through the mesh network to enable the given asset to access a remote support gateway;
one of creating and updating a network routing data structure associated with the given asset based on the route discovery operation, wherein the network routing data structure comprises route weights associated with the identified one or more routes, and wherein the route weights comprise a received signal strength (RSS) magnitude relative to an antenna dynamic range of a positioning beacon associated with the given asset;
advertising, by the given asset, to the compute, storage and network assets in the computing environment, at least a portion of the routing data structure to enable access of at least one of the compute, storage and network assets to the remote support gateway, wherein advertising the portion of the routing data structure comprises advertising the identified one or more routes with priorities based on their associated route weights; and
broadcasting, by the given asset, multiple remote support gateway versions to which the given asset can connect;
wherein the steps are performed via at least one processing device.

2. The method of claim 1, further comprising the given asset accessing a remote support service through the remote support gateway.

3. The method of claim 1, further comprising determining a proximate locality of one or more of the compute, storage and network assets with respect to the given asset.

4. The method of claim 3, wherein the given asset or one or more of the compute, storage and network assets serves as an anchor node to triangulate the proximate locality.

5. The method of claim 3, further comprising determining an approximate dimension of the given asset using a subset of the compute, storage and network assets.

6. The method of claim 1, further comprising the given asset selecting one or more routes to the remote support gateway based on received signal strength from positioning beacon signals of neighboring assets.

7. The method of claim 1, further comprising the given asset broadcasting a positioning beacon signal and a default route.

8. The method of claim 1 further comprising selecting, by the given asset, a given route of the one or more routes through the mesh network based on remote support gateway version compatibility between the given asset and the remote support gateway.

9. The method of claim 1, wherein the broadcasting, by the given asset, multiple remote support gateway versions to which the given asset can connect includes identifying the remote support gateway versions in the routing data structure.

10. The method of claim 1, wherein the positioning beacon associated with the given asset is installed on the given asset during manufacturing of the given asset.

11. A system, comprising:
at least one processor, coupled to a memory, and configured to:
in a computing environment comprising a plurality of compute, storage and network assets, initiate at a given asset a join operation for the given asset to become a member of a mesh network formed by the plurality of compute, storage and network assets;
one of create and update a network neighbor data structure associated with the given asset based on the join operation;
initiate at the given asset a route discovery operation to identify one or more routes through the mesh network to enable the given asset to access a remote support gateway;
one of create and update a network routing data structure associated with the given asset based on the route discovery operation, wherein the network routing data structure comprises route weights associated with the identified one or more routes, and wherein the route weights comprise a received signal strength (RSS) magnitude relative to an antenna dynamic range of a positioning beacon associated with the given asset;
advertise, by the given asset, to the compute, storage and network assets in the computing environment, at least a portion of the routing data structure to enable access of at least one of the compute, storage and network assets to the remote support gateway, wherein advertising the portion of the routing data structure comprises advertising the identified one or more routes with priorities based on their associated route weights; and
broadcasting, by the given asset, multiple remote support gateway versions to which the given asset can connect.

12. The system of claim 11, wherein the at least one processor and memory are further configured to enable the given asset to access a remote support service through the remote support gateway.

13. The system of claim 11, wherein the at least one processor and memory are further configured to determine a proximate locality of one or more of the compute, storage and network assets with respect to the given asset.

14. The system of claim 11, wherein the at least one processor and memory are further configured to enable the given asset to select one or more routes to the remote support gateway based on received signal strength from positioning beacon signals of neighboring assets.

15. The system of claim 11, wherein the at least one processor and memory are further configured to enable the given asset to broadcast a positioning beacon signal and a default route.

16. The system of claim 11, wherein the at least one processor and memory are further configured to enable selecting, by the given asset, a given route of the one or more routes through the mesh network based on remote support gateway version compatibility between the given asset and the remote support gateway.

17. An article of manufacture comprising a non-transitory processor-readable storage medium having encoded therein executable code of one or more software programs, wherein the one or more software programs when executed by at least one processing device implement steps of:

in a computing environment comprising a plurality of compute, storage and network assets, initiating at a given asset a join operation for the given asset to become a member of a mesh network formed by the plurality of compute, storage and network assets;

one of creating and updating a network neighbor data structure associated with the given asset based on the join operation;

initiating at the given asset a route discovery operation to identify one or more routes through the mesh network to enable the given asset to access a remote support gateway;

one of creating and updating a network routing data structure associated with the given asset based on the route discovery operation, wherein the network routing data structure comprises route weights associated with the identified one or more routes, and wherein the route weights comprise a received signal strength (RSS) magnitude relative to an antenna dynamic range of a positioning beacon associated with the given asset;

advertising, by the given asset, to the compute, storage and network assets in the computing environment, at least a portion of the routing data structure to enable access of at least one of the compute, storage and network assets to the remote support gateway, wherein advertising the portion of the routing data structure comprises advertising the identified one or more routes with priorities based on their associated route weights; and broadcasting, by the given asset, multiple remote support gateway versions to which the given asset can connect.

18. The article of claim 17, further comprising the given asset accessing a remote support service through the remote support gateway.

19. The article of claim 17, further comprising the given asset selecting one or more routes to the remote support gateway based on received signal strength from positioning beacon signals of neighboring assets.

20. The article of claim 17, further comprising selecting, by the given asset, a given route of the one or more routes through the mesh network based on remote support gateway version compatibility between the given asset and the remote support gateway.

* * * * *